(No Model.) 15 Sheets—Sheet 1.

J. W. HARRISON.
COAL MINING MACHINE.

No. 532,730. Patented Jan. 15, 1895.

(No Model.)
15 Sheets—Sheet 2.

J. W. HARRISON.
COAL MINING MACHINE.

No. 532,730. Patented Jan. 15, 1895.

Witnesses:
Inventor.
Jonathan W Harrison
Per O D Lewis Att'y (No Model.) 15 Sheets—Sheet 3.

J. W. HARRISON.
COAL MINING MACHINE.

No. 532,730. Patented Jan. 15, 1895.

Witnesses: Inventor.
Jonathan W. Harrison
O. D. Levis
Atty.

(No Model.)
15 Sheets—Sheet 4.
J. W. HARRISON.
COAL MINING MACHINE.
No. 532,730. Patented Jan. 15, 1895.
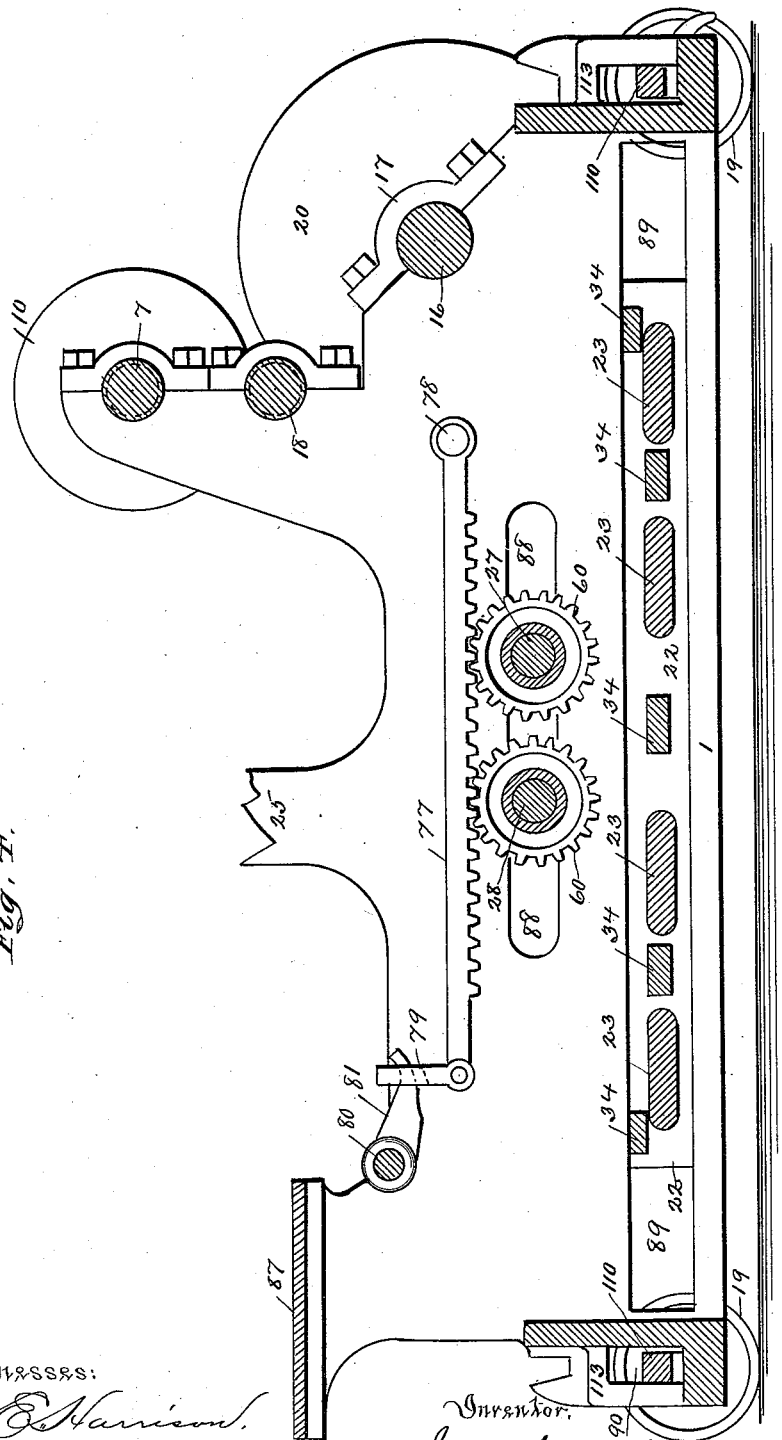
Fig. 4.
Witnesses:
Inventor,

(No Model.) 15 Sheets—Sheet 6.

J. W. HARRISON.
COAL MINING MACHINE.

No. 532,730. Patented Jan. 15, 1895.

Witnesses: Inventor.

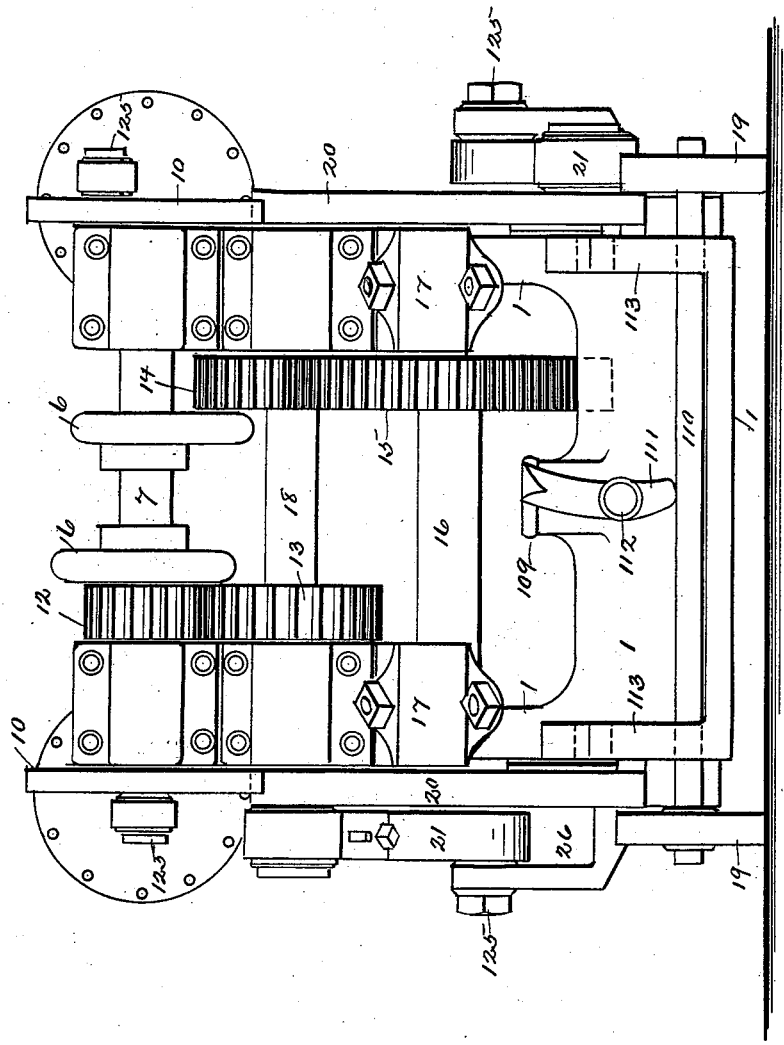

(No Model.) 15 Sheets—Sheet 8.
J. W. HARRISON.
COAL MINING MACHINE.
No. 532,730. Patented Jan. 15, 1895.
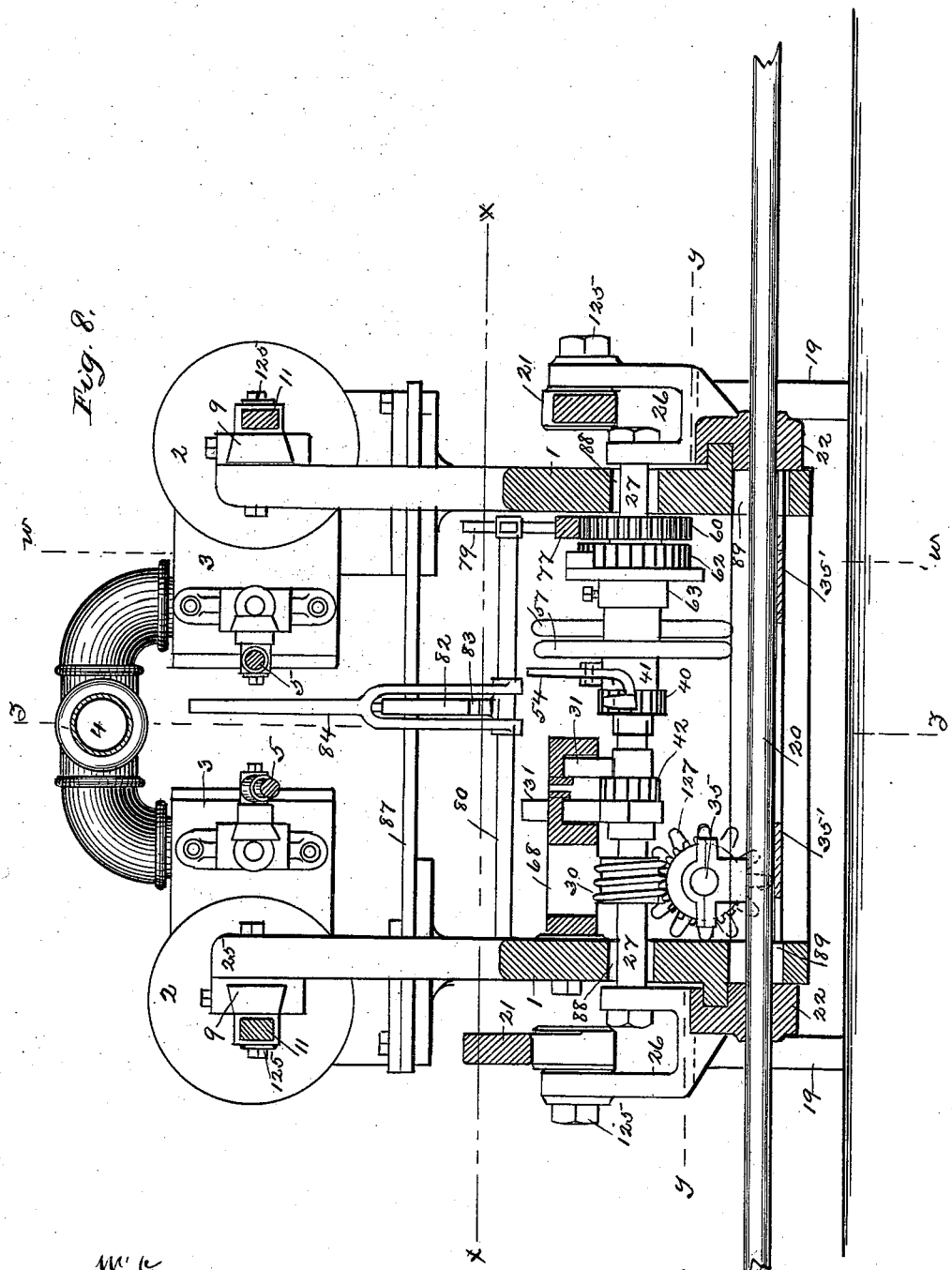

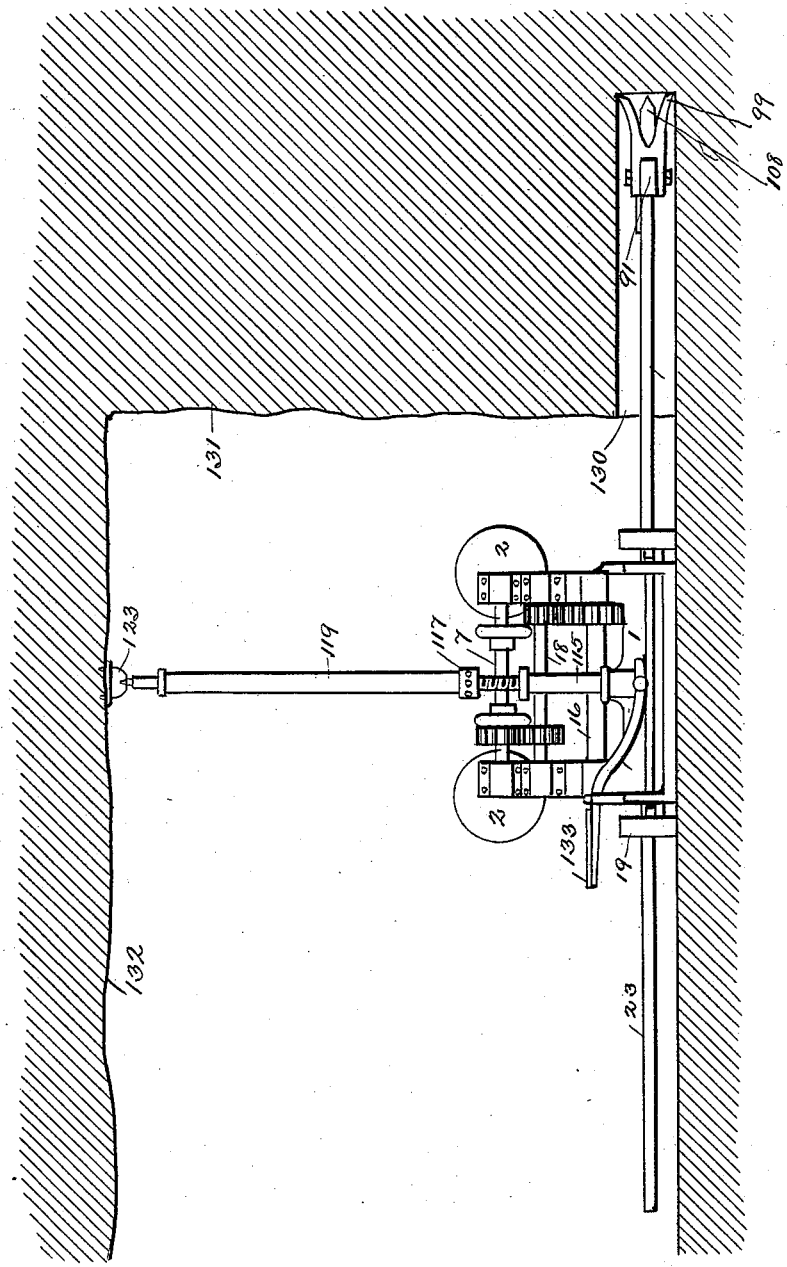

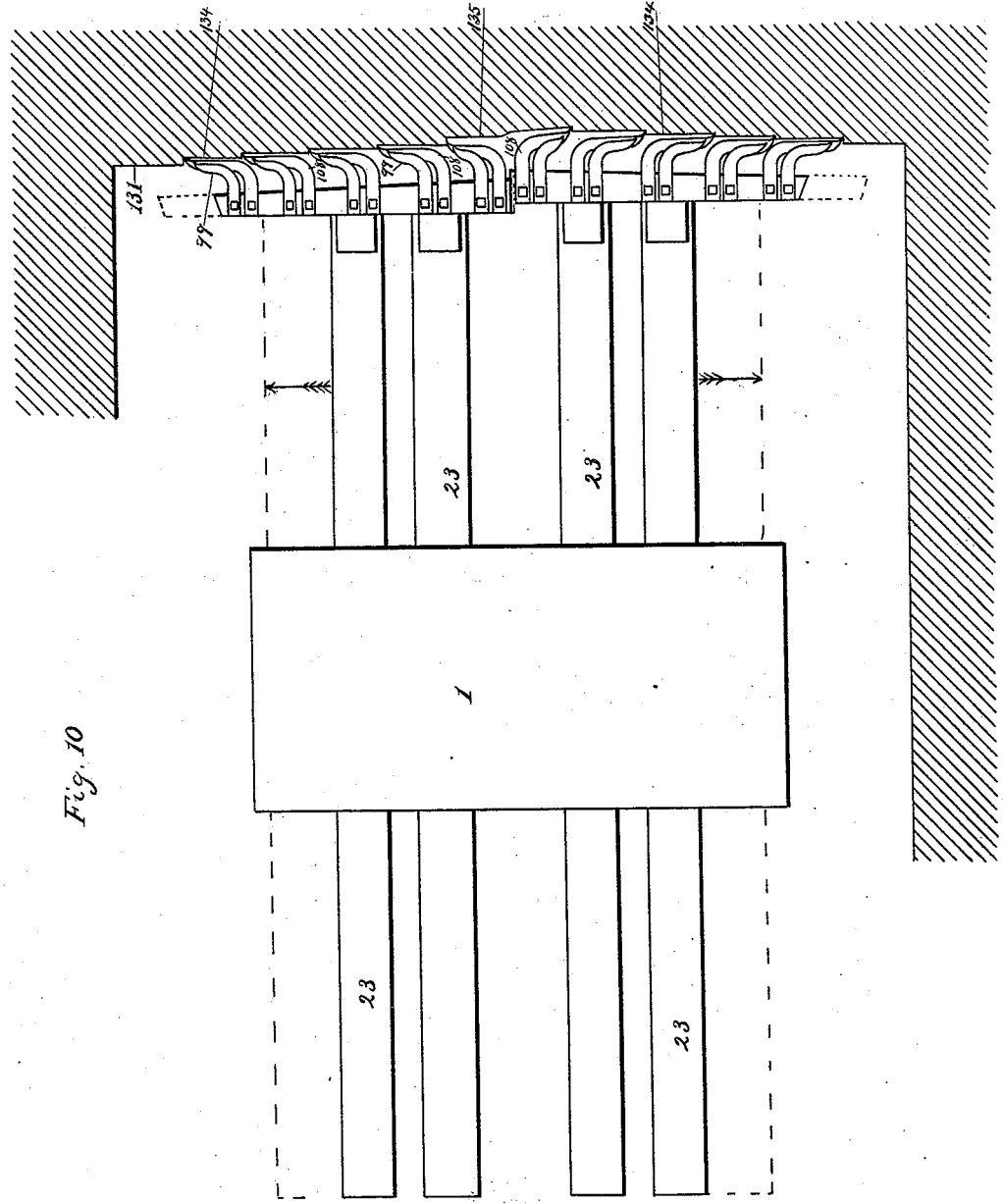

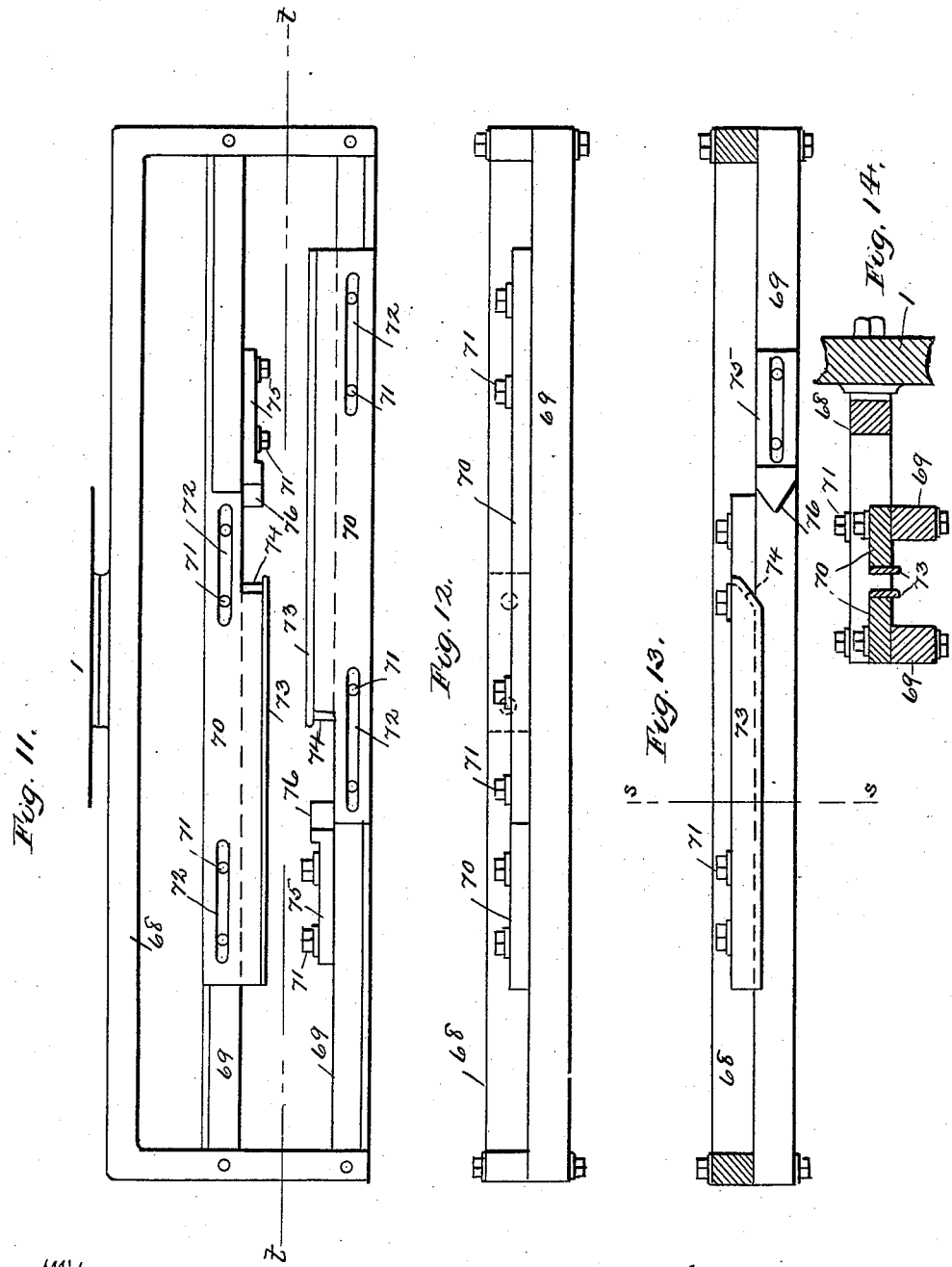

(No Model.)
J. W. HARRISON.
COAL MINING MACHINE.
No. 532,730. Patented Jan. 15, 1895.
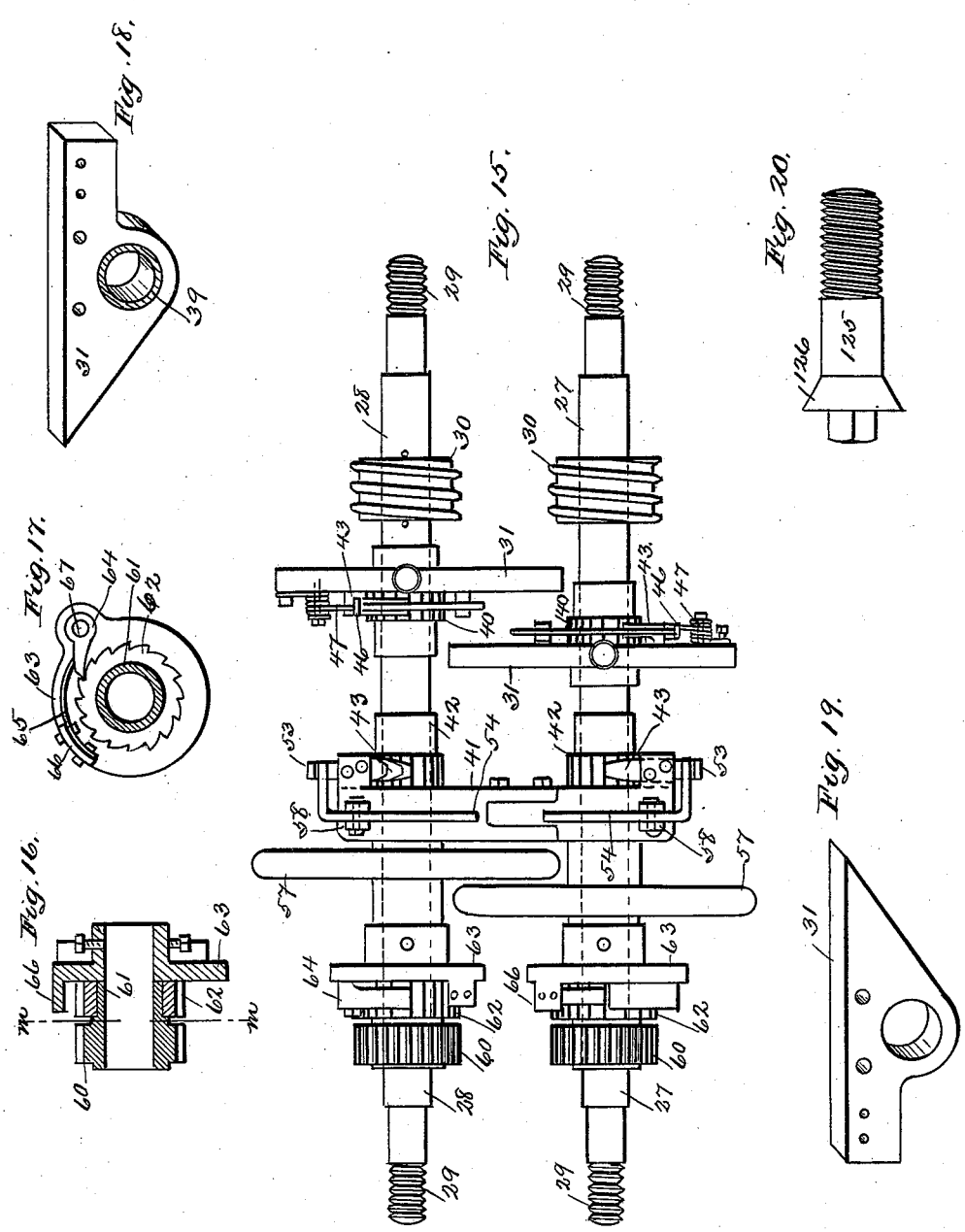

(No Model.) 15 Sheets—Sheet 13.
J. W. HARRISON.
COAL MINING MACHINE.
No. 532,730. Patented Jan. 15, 1895.
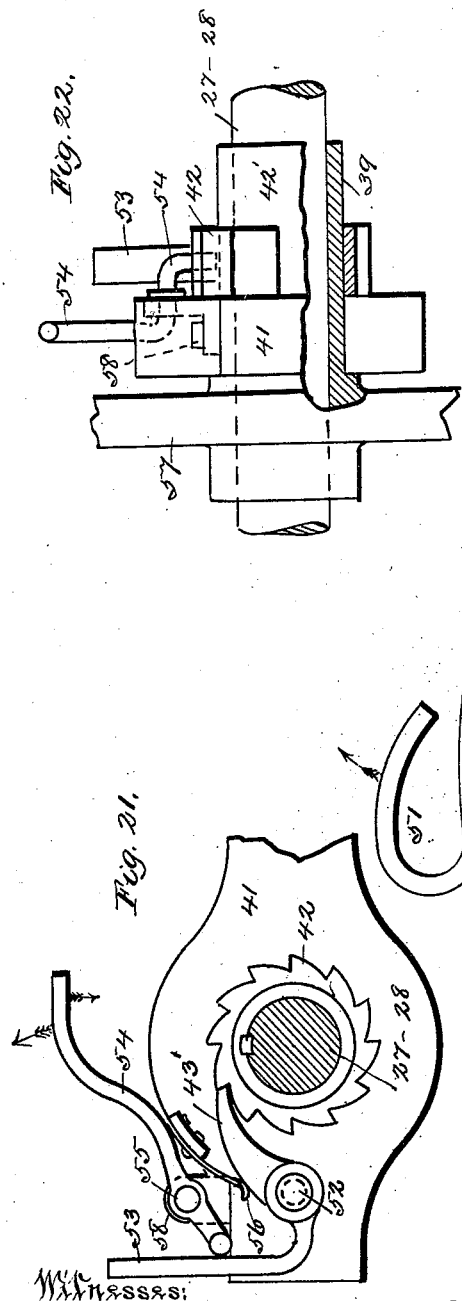
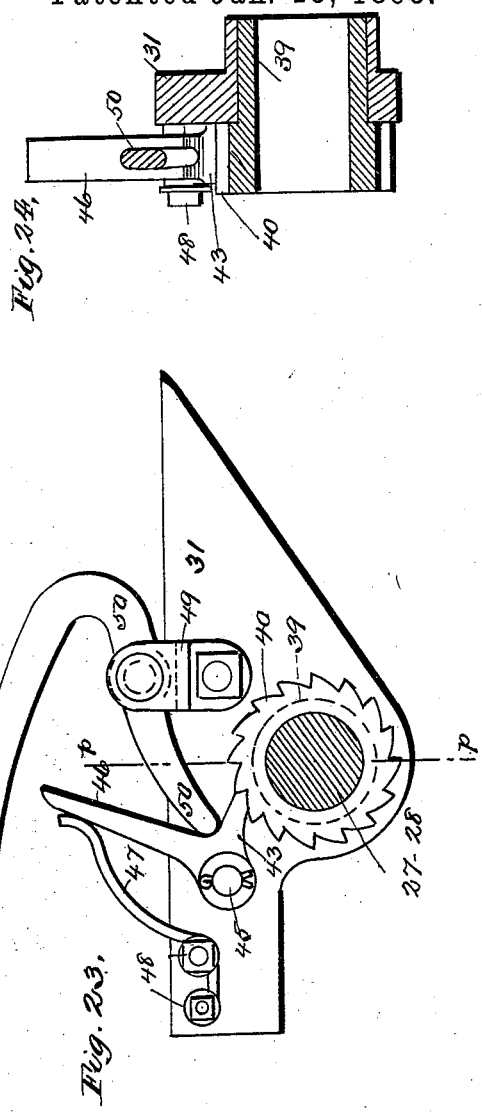
Witnesses:
M. E. Harrison
J. A. Herron
Inventor,
Jonathan W. Harrison
Per O. D. Levis
Att'y.
THE NORRIS PETERS CO., PHOTO-LITHO., WASHINGTON, D. C.

(No Model.)  J. W. HARRISON.  15 Sheets—Sheet 14.
COAL MINING MACHINE.
No. 532,730.  Patented Jan. 15, 1895.
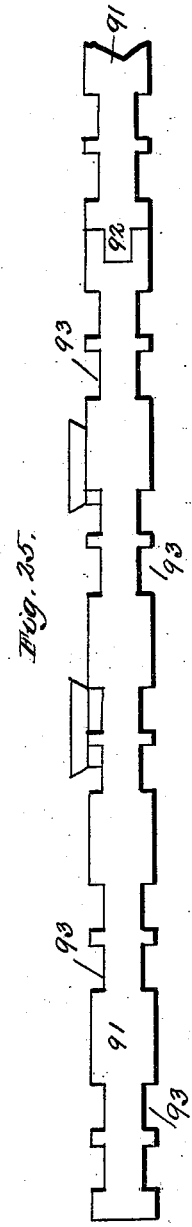
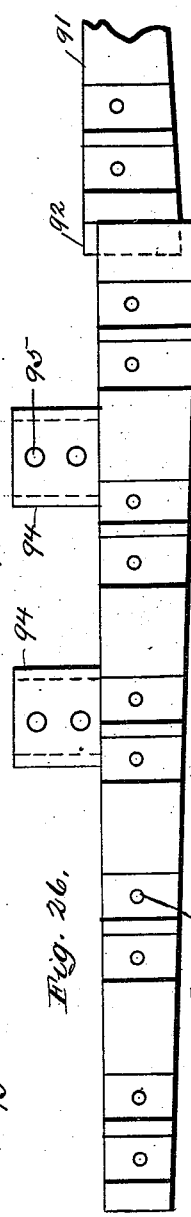
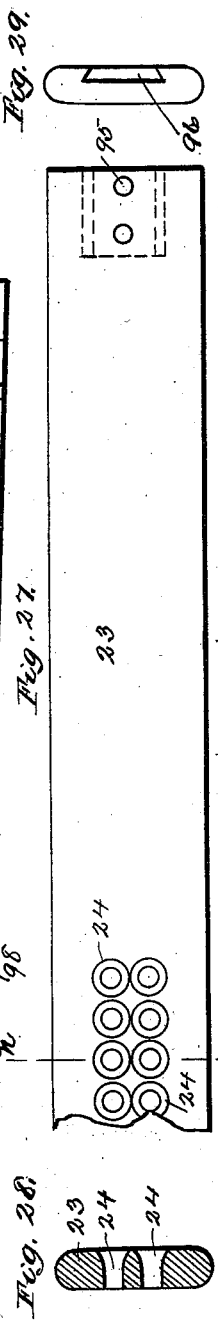
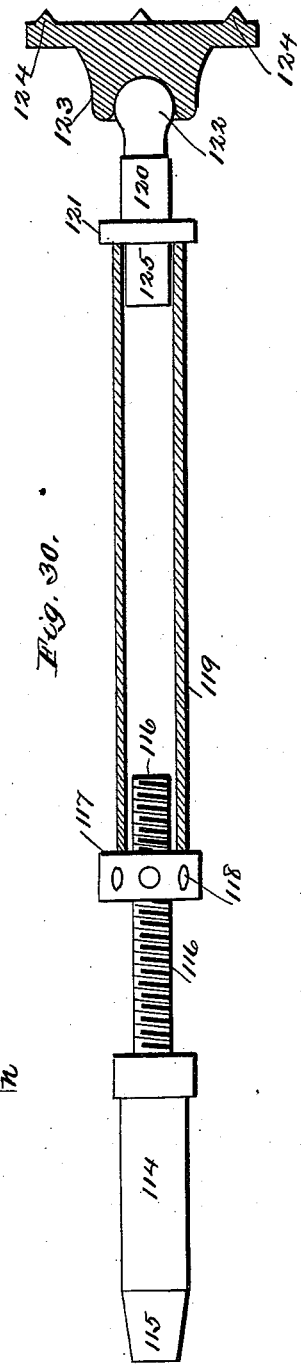

(No Model.)  
15 Sheets—Sheet 15.
J. W. HARRISON.
COAL MINING MACHINE.
No. 532,730. Patented Jan. 15, 1895.
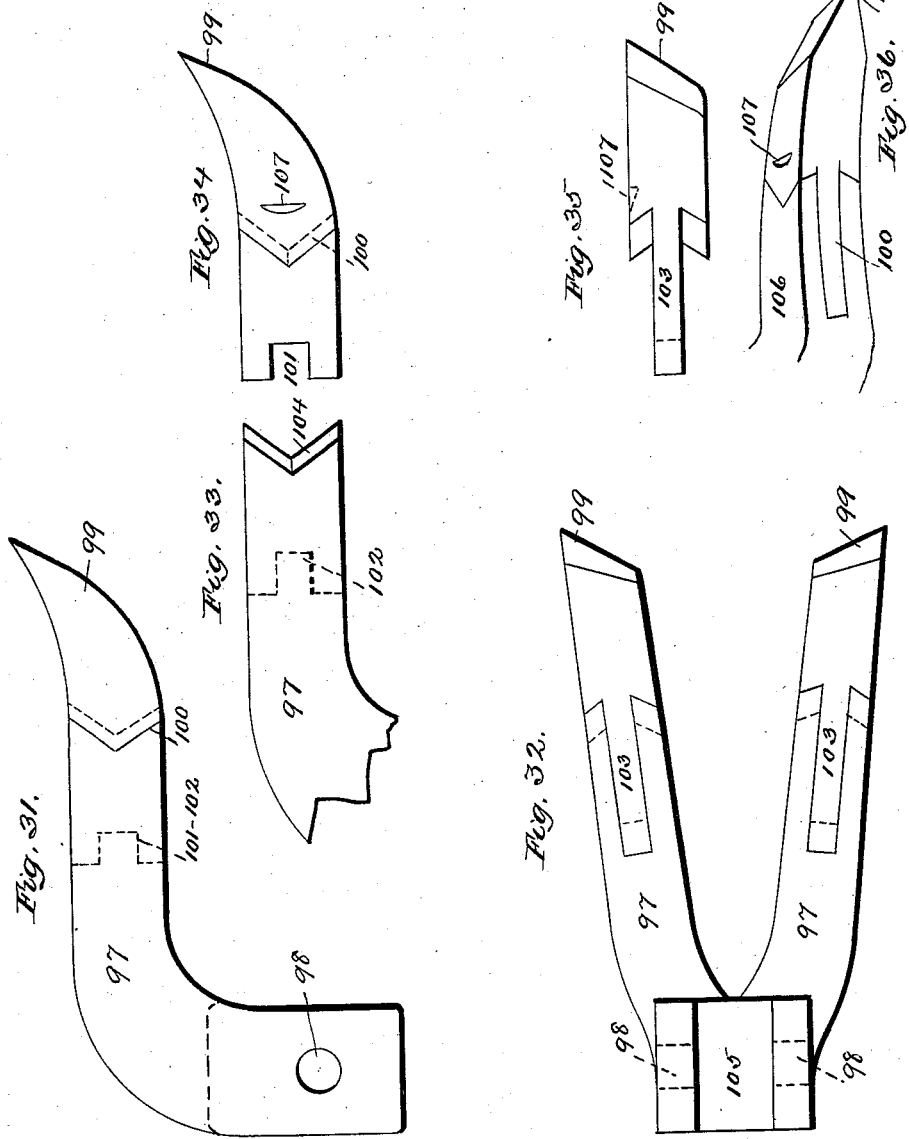

United States Patent Office.

JONATHAN W. HARRISON, OF YPSILANTI, MICHIGAN.

COAL-MINING MACHINE.

SPECIFICATION forming part of Letters Patent No. 532,730, dated January 15, 1895.

Application filed August 9, 1893. Serial No. 482,721. (No model.)

*To all whom it may concern:*

Be it known that I, JONATHAN W. HARRISON, a citizen of the United States, residing at Ypsilanti, in the county of Washtenaw and State of Michigan, have invented certain new and useful Improvements in Coal-Mining Machines; and I do hereby declare the following to be a full, clear, and exact description of the invention, such as will enable others skilled in the art to which it pertains to make and use the same, reference being had to the accompanying drawings, which form a part of this specification.

My invention relates to an improved coal mining machine, and consists in a series of cutters arranged on suitable bars, a means for giving the same a reciprocating movement, a means for automatically feeding the said bars and cutters forward, a means for rapidly moving the same back, a means for elevating or lowering the machine to the floor, together with the peculiar construction, arrangement, and combination of the cutters and manner of operating the same, and certain other details of construction, and combination of parts as will be fully described hereinafter.

Figure 1:
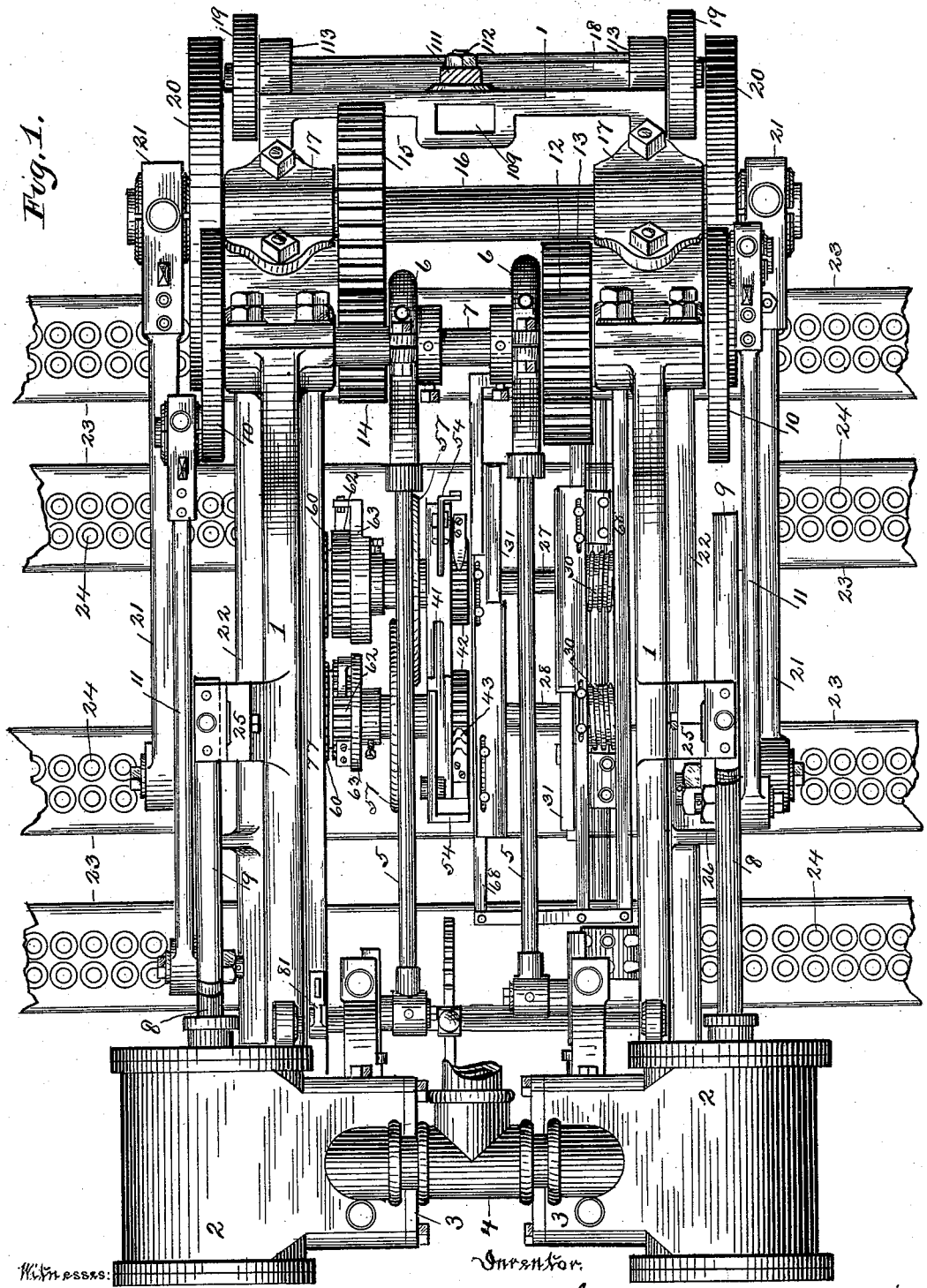
Figure 2:
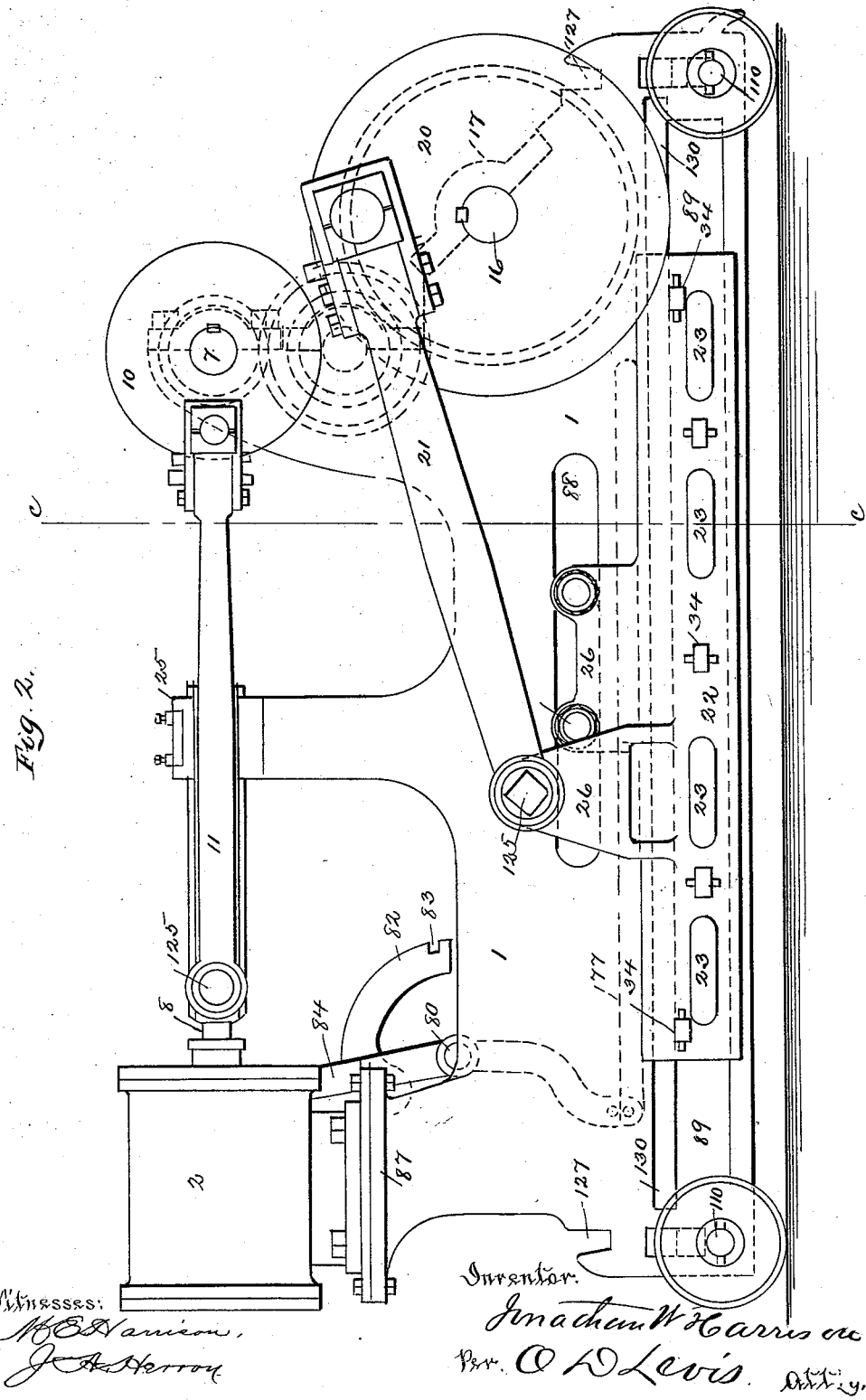
Figure 3:
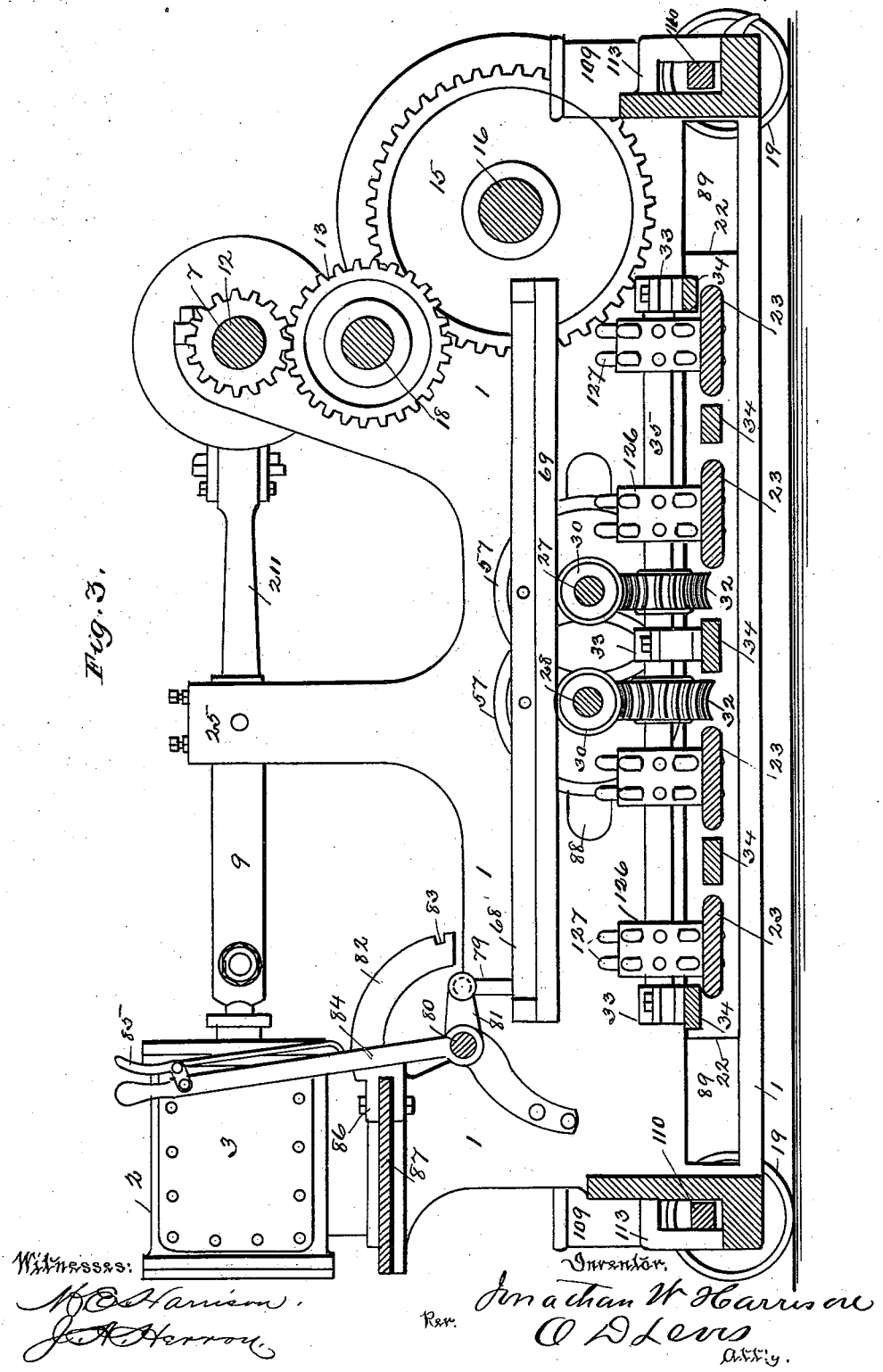
Figure 5:
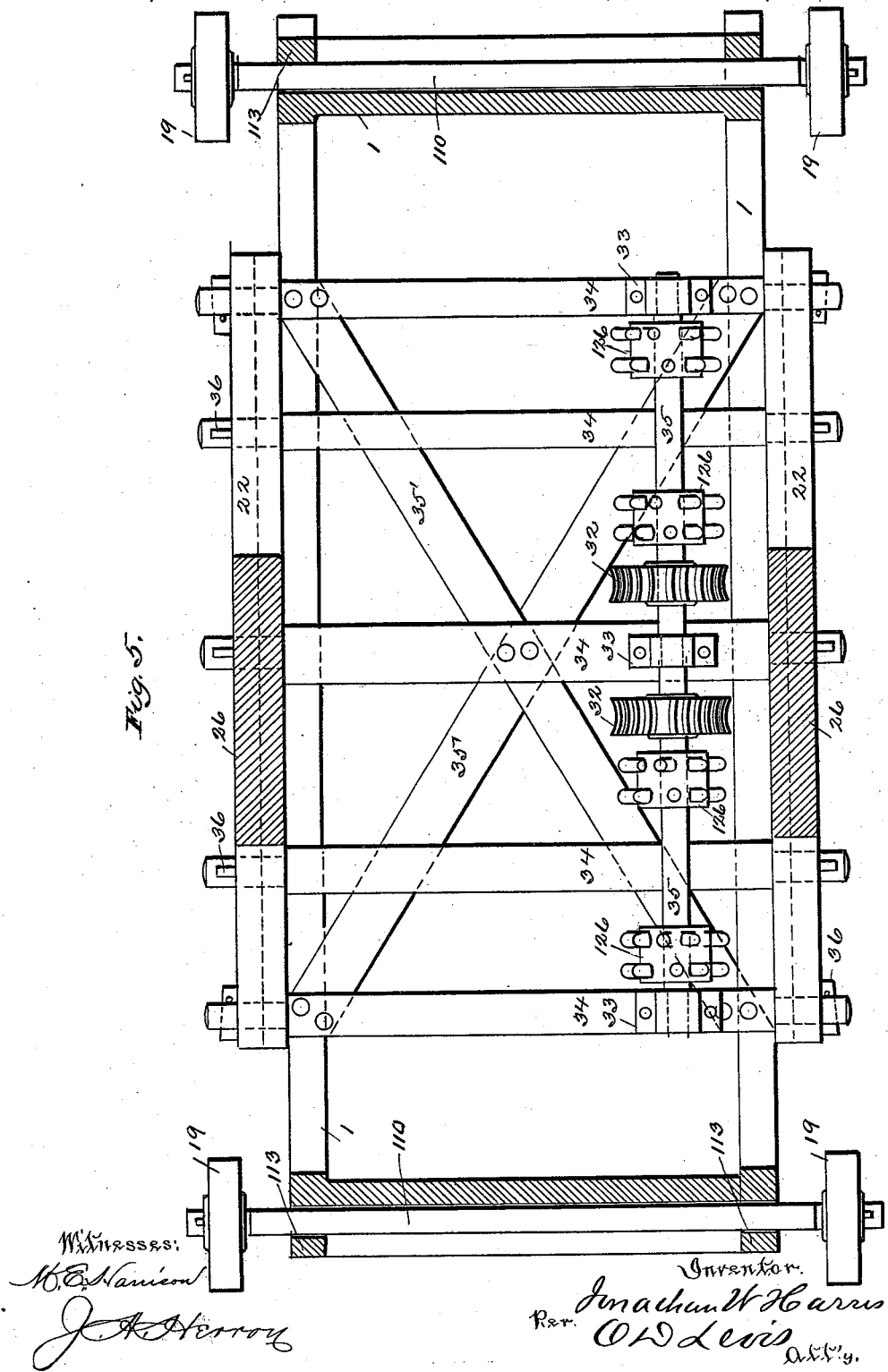
Figure 6:
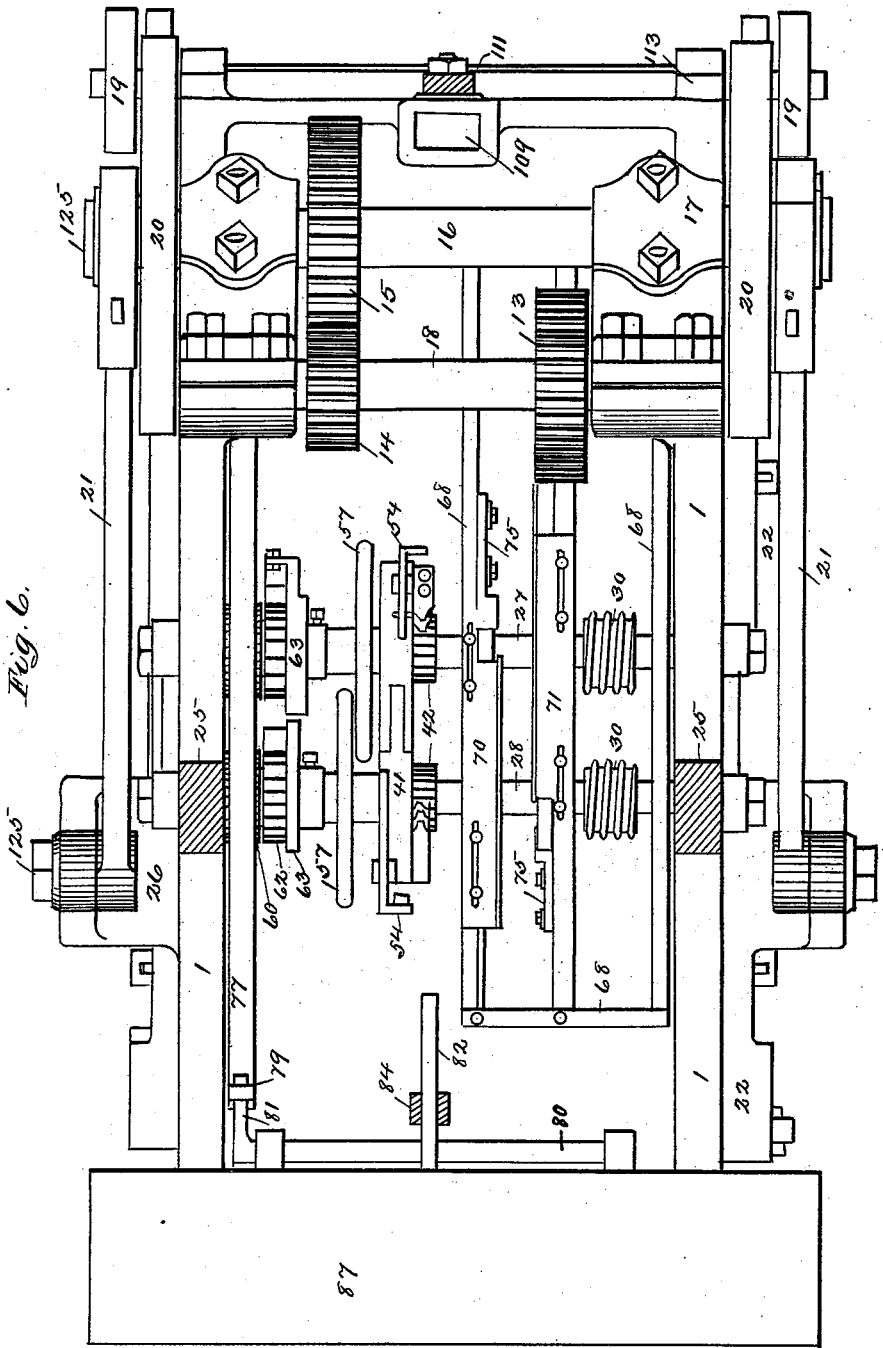

In the accompanying drawings, Figure 1 is a plan view of my improved coal mining machine, having the cutters and a portion of the feed bars removed therefrom. Fig. 2 is a rear elevation of the same. Fig. 3 is a rear sectional elevation of the machine, said section taken on the line $z$—$z$ of Fig. 8. Fig. 4 is a rear sectional elevation taken on the line $w$—$w$ of Fig. 8. Fig. 5 is a sectional plan view taken on the line $y$—$y$ of Fig. 8. Fig. 6, is a sectional plan view of the machine taken on the line $x$—$x$ of Fig. 8. Fig. 7 is an end elevation of the machine having the feed bars and cutters removed therefrom. Fig. 8, is an end sectional elevation taken on the line $c$—$c$ of Fig. 2. Fig. 9 is an end elevation of the machine at work. Fig. 10, is a plan view of the same. Fig. 11, is an enlarged detailed plan view of the stationary frame for operating the feed mechanism. Fig. 12, is a front elevation of the same. Fig. 13, is a sectional front elevation of the frame, said section taken on the line $t$—$t$ of Fig. 11. Fig. 14, is a cross sectional elevation of the said frame taken on the line $s$—$s$ of Fig. 13. Fig. 15 is an enlarged plan view of the feed shafts, and their connected mechanism. Fig. 16 is a sectional elevation taken through one of the gear wheels and ratchet for recovering the feed or bringing the cutters back. Fig. 17 is a sectional face view taken on the line $m$—$m$ of Fig. 16. Fig. 18 is a perspective view of the left hand triangular lever for operating the feed of the cutters. Fig. 19, is a perspective view of the right hand triangular lever. Fig. 20, is a side elevation of one of the wrist or crank pins used in connection with the machine. Fig. 21 is a side elevation of one of the ratchets and support for operating the feed by means of a hand wheel. Fig. 22, is an end elevation of the same. Fig. 23, is a side elevation of one of the triangular feed operating levers together with its connected ratchet wheel, and means for operating the same. Fig. 24 is an end sectional elevation of the same taken on the line $p$—$p$ Fig. 23. Fig. 25, is a front elevation of one of the cutter bars, and a portion of the other. Fig. 26, is a plan view of the same. Fig. 27, is a plan view of a portion of one of the feed bars. Fig. 29 is a front elevation of the same. Fig. 28, is a sectional end elevation of the said bar taken on the line $n$—$n$. Fig. 30 is a side elevation of the device used for holding the machine rigid while in operation. Fig. 31 is an enlarged plan view of one of the double cutters, showing a removable point. Fig. 32, is a side elevation of the same. Fig. 33 is a plan view of the said cutter having the point removed therefrom. Fig. 34 is a plan view of the point removed from the shank. Fig. 35 is a side elevation of the point. Fig. 36, is a perspective view of one of the single pointed cutters arranged when in position between the points of the other or double cutter.

To put my invention into practice and thereby construct a machine for undermining or cutting coal, I provide a frame 1 of a suitable size and form, and mount the same upon wheels 19, in a manner that the said frame may either be suspended to the axles 110, or dropped to and resting on the floor. To accomplish this vertical movement of the frame 1, the axles 110 are arranged in guides 113 at the front and rear of the machine, and operated by means of hand levers 111, pivoted at 112 to the frame (see Figs. 7 and 8) and when the said levers 111 are at rest in a horizontal position in the grooves 127, the same forms a support for a platform 133 upon which the operator may stand while working the machine.

Arranged at one side on the machine and supported by the frame 1 are two cylinders 2, fitted with steam chests, 3, pistons 8, slides 25, slide bars 9, valve rods 5, eccentrics 6 attached to a drive shaft 7 secured in bearings at the other side of the machine; together with all the other several parts of a steam engine common to the art. Each of the piston rods 8 of these engines are connected to a pitman 11 pivoted by means of a wrist-pin 125 to disk-cranks 10, each of which is rigidly attached to the drive shaft 7. Attached to this shaft 7 between the bearings is a pinion 12, which is in mesh with a small toothed wheel 13 secured to a counter-shaft 18 below. This shaft 18 is suitably mounted in bearings beneath the upper shaft 7 and is provided with a gear wheel 14, which in its turn transmits its motion to a large toothed wheel 15 attached to a second driving shaft 16. This shaft 16 is arranged in bearings 17, and is provided with large disk-cranks 20 at each end which are connected by pitmen 21 to a sliding carriage 22, capable of a reciprocating movement in the direction of the length of the frame 1.

By means of this chain of gearing above described, and the disk-cranks, and their connecting pitmen, the table or carriage 22 is given a rapid reciprocating movement, as well as an increase in the length of the stroke over that of the pistons. This reciprocating carriage consists of two side pieces 22, operating along slides 130 (see Figs. 2, and 8) and connected together through an oblong opening 89 in each side of the frame 1, by means of stout bars 34, and wedges 36. To further strengthen this carriage 22, two flat bars or braces 35' are securely riveted in a diagonal position (see Fig. 5) beneath the bars 34. Mounted in bearings 33 supported upon and attached to the cross-bars, is a shaft 35 which operates the feeding mechanism hereinafter described. This shaft 35 is provided with four wheels of peculiar construction, each of which is provided with a double row of teeth or pins 127, arranged at regular intervals about the periphery, and adapted to engage with a like number of bars 23 provided with registering openings 24, and capable of moving transversely through the carriage 22. These bars 23 (see Figs. 27, 28, and 29) each consist of a steel bar of a suitable length, having rounded edges, and the forward ends of which are provided with a dove-tailed recess 96 to attach the same to the cutter bars 91, and each provided with a double row of circular openings 24 having flaring mouths, and adapted to engage with the teeth of the toothed wheels 126. Attached to this same shaft 35 are two worm-wheels 32, which engage with two worms 30 mounted on separate and independently operated shafts 27—28, (see Figs. 15, 16, 17, 18, and 19) above. These shafts 27—28 are each mounted in bearings formed in brackets 26 attached to or integral with the sliding carriage 22, and are attached in position by means of nuts screwed on the threaded ends 29 of the same. One of these shafts is for the purpose of operating the feed of the left hand cutter bar and the other, for the right hand bar. Therefore the description relating to the one will substantially cover the other, except that the parts are right and left. To operate these shafts 27—28, by the reciprocating movement of the carriage 22 the same are each provided with small ratchet-wheels 40, each of which is rigidly attached to the said shafts, and provided with an elongated hub 39, upon which is mounted triangular shaped levers 31, capable of being oscillated. Each of these levers 31 are fitted with a pawl 43, pivoted in position by means of a pin 45, and having an upward integral extension 46 against which one end of a spring 47 bears, and a portion of said spring coiled about a pin, and the free end attached to another pin 48 secured in the side of the triangular levers 31. Attached to the said levers 31, are bearings 49 which support a pivoted lever 50, to engage with the upright portion 46 of the pawl 43. By means of this pawl 43 the lever 31 is locked or made to revolve with the shaft when oscillated in one direction, and loose when moved in the other, and by means of the lever 50 the extension 51 may be moved up the integral portion 46 of the said pawl to disengage the same from the ratchet wheel 40. These oscillating levers 31 are operated by a stationary frame 68 (see Figs. 12, 13, and 14) attached to the inside of the main frame 1 by means of bolts. This frame consists in a bent bar 68, having attached thereto two other bars 69, each of which support a means for operating the levers 31, while the same are moving back and forward beneath the same. Arranged upon each of these bars 69 is an adjustable guide plate 70 attached in position by means of bolts 71 passing through slots 72, formed in the direction of the length of the same. Each of these plates 70 are arranged in connection with a side plate 73, which projects slightly below the lower edge to form a shallow channel in which the top of the levers 31 operate. Formed at one end of each of these guide plates 70 are inclined surfaces 74, which in connection with a wedge shaped portion 76, formed on the inner ends of two other plates 75, adjustably attached to the sides of the bars 69, form passages through which the points of the levers 31 pass to give the same an oscillating motion to rotate the shafts 27—28.

This mechanism above described is for the purpose of feeding the bars 23 forward slowly and evenly, while the machine is engaged in undercutting the coal, and to provide a device for rapidly recovering the bars 23 when fed to their full length or bring the same to their former position. The pawls 43 are disengaged from their ratchet wheels 40, and devices arranged at the forward ends of the shafts 27—28 for this purpose. These devices each consist of a small toothed wheel 60, (see Figs. 15, 16, and 17,) loosely mounted upon said shafts, and each formed with a hub 61, upon which ratchet wheels 62 are rigidly connected. Arranged at one side of each of these set of wheels is a disk 63, rigidly connected to the said shafts by set-screws, and each having pivoted thereto by means of a pin 67, a pawl 64, to engage with the said ratchet wheels 62. A spring 65 attached to a lug 66, and bearing on the pawls 64 serves as a means of keeping the same engaged with the teeth of the ratchet wheel 62. Pivoted to the frame 1 above the toothed wheels by means of a pin 78 is a rack bar 77, capable of being elevated out of reach of the said wheel 60, or dropped down into mesh with the same. This bar is operated by a hand lever 84, attached to a shaft 80 suitably journaled in a horizontal position beneath the forward ends of the cylinders 2. (See Figs 3, 4, and 8.) Attached to this shaft 80 is a crank 81, loosely connected to a bar 79, pivoted to the free end of the rack-bar 77. Arranged in connection with the hand lever 84, is a curved piece 82, with notches 83, to engage with a dog-lever 85, and the said curved piece attached to and supported by a bolt 86 passing through lugs formed integral with the said curved piece, and through a cross plate 87, in a manner that when the said lever 84 is thrown down, and the dog 85 engaged with the lower notch 83, the rack bar 77 is in mesh with the toothed wheels 60, and when in a position such as shown at Fig. 3 on the drawings, the said rack-bar is disengaged from the said wheels.

By means of this mechanism last described, the rack-bar 77 may be engaged with the toothed wheels 60 (having first released the pawls 43) the bars 23 may be rapidly moved back after undercutting the coal to the desired depth.

To operate the feed mechanism by hand, for the purpose of adjusting the cutter bars, and when fitting the machine (see Figs. 21 and 22) together, a hand wheel 57 is rigidly attached to each shaft 27—28 and having hubs 42 of a sufficient length to support a bearing or bar 41, spanning the space between the said shafts, and used to support the ratchet pawls and levers for operating the same. Attached to the said hubs 42' at the opposite sides of the support 41, are ratchet wheels 42, firmly attached to the said hubs 42', each of which is provided with a pawl 43, having a vertical integral lever 53, pivoted at 52 to the support 41. These pawls 43 are held in contact with their ratchet wheels by means of springs 46, and may be disengaged from said wheels by means of hand-levers 54 pivoted to the bearings 58 attached to the supporting bar, and operated in about the same manner as the levers 50 before described. By means of these hand wheels 57 each cutter bar 91 may be moved back and forward, and adjusted the one with the other, by first lifting the levers 50 to disengage the pawls 43 after which either of the shafts 27—28 may be revolved to feed the bars 23 forward or back, by simply revolving the hand wheel 57.

Operating transversly through the carriage 22, are the bars previously described, which are coupled together in pairs at their forward ends by the cutter bars 91. These bars 91 are attached in position by means of integral dove-tailed projections 94, formed at the rear of each bar; adapted to enter into corresponding recesses 96 formed in the forward ends of each bar 23, and the several parts held rigidly together by means of bolts 95. These cutter bars 91 (see Figs. 25 and 26) are arranged in a horizontal position, the one in line with the other at a certain position, and their abutting ends tongued and grooved at 92, to hold the two horizontal, but not to prevent the one working independent of the other. Each of these bars 91 are tapering and formed with a series of recesses 93 arranged in the top and bottom surface of the said bars, and used for the purpose of attaching the cutters thereto by means of bolts 96.

The cutters attached to the tapering bars 91 are all the same length from the shoulder to the points, and as the large ends of the bars are inward the cutters at the middle project farther than those at either side, making a gradual taper from the center to each end of the bar. These cutters are of two kinds, the one being doubled pronged, and adapted to cut at the top and bottom of the undercut, and the other to remove the center of the same. These cutters are arranged in pairs, consisting of a single and double cutter along the length of the two bars 91. The double cutter 97 (Figs. 31, 32, 33, 34, and 35) consists in a clevis 105, adapted to span the cutter bar 91 transversely in one of the recesses 93, and be secured therein by the bolt 98, and two outwardly flaring tangs terminating in beveled chisel points 99. These tangs are bent at a right angle to the clevis 105, and the points curved outwardly in a manner that the same will be in the lead, and the body of the cutter kept a short distance from the coal to prevent unnecessary friction, and clogging of the parts. These cutters as described may be forged from a single piece of steel, but I prefer to have removable points such as are shown on the drawings. These points 99 are fitted in a recess formed in each shank of the cutter, and said recess having an integral rectangular portion 102, and a beveled V shaped end 104, for the reception of a corresponding tongue 103, having inwardly beveled V shaped shoulders 100, to fit neatly about the V shaped portion of the shank, and a recess 101 to correspond and fit about the integral portion 102. A recess 107 formed in the top of the point 99 serves as a means of disconnecting the said point from the shank, by inserting the point of a chisel or other tool and tapping the same with a hammer.

It will be observed that the connection between the points and shank of the cutter, is completed without the use of bolts or other fastenings, other than the integral parts of the same, and as the greatest strain of the work upon the points is parallel with the cutter bars 91; and any strain toward or away from said bars will be resisted by the integral portions 102, and beveled V shaped portions 104. A number of these points may be kept constantly on hand, to replace without loss of time those that have become blunted by constant use.

Operating in conjunction with the above described double cutter for the purpose of removing the center of the under-cut, is a single diamond pointed cutter 108 (see Fig. 36) arranged between the points 99, and attached to the bars 91 at the rear of each double cutter, in the manner before described. These two described cutters are arranged in pairs, the smallest at the outer extremities of the bars 91, and gradually increasing in length to the center, and each pair consisting of one of the double pointed cutters and one of the single or diamond points; the latter attached to the bar at the rear of the former, and the points or cutters of each bar 91 extending in opposite directions, thereby dividing the work of undermining the coal between the back and forward movement of the carriage 22. By thus arranging the cutters the coal is cut in a series of steps 134 (see Fig. 10) which affords a means of entering or feeding the one set of cutters forward while the other set is cutting the coal.

To afford a means for holding the machine stationary while in operation, two sockets 109 are formed in the frame 1, the one at the front and the other at the rear, in which is placed a device such as shown at Fig. 30 on the drawings, and also shown in position at Fig. 9. This apparatus consists of a bar 114 having a tapering end 115, and a threaded shaft 116 fitted with a large nut 117. This nut 117 is formed with a series of radial openings 118 for the purpose of entering a bar to turn the same. A tube 119 of the proper length to correspond to the height of the room is placed on the top of the nut 117, and a ball socket in the top of the tube. This socket consists of a flange having barbs 124, to engage with the roof 132, a socket 123 to engage with the ball 122, a cylindrical portion 120, and flange 121 to bear against the top of the tube 119, and a socket 125 to confine the same in the mouth of the said tube. The tapering portion of this last described apparatus is placed in the socket 109, having first lowered the machine to the floor by means of the lever 111 as above described, and the several parts fitted together as shown at Fig. 9 and the nut 117 operated to lengthen the device until the desired pressure has been placed on the machine.

It will be noticed by reference to Fig. 10 on the drawings that the single or diamond pointed cutter 108 at the outer ends of the bars 91 are in the lead or advance of the double pronged cutters, which is preferable, as the same will plow a groove in the center of the undercut and lessen the resistance offered to the double pointed cutter 99 following, while in each of the other pairs, the double cutter takes the lead, as the work is somewhat easy compared with that of the two leading cutters before mentioned, which are at the end of the stroke brought against the solid ends or walls of the undercut.

The operation of the machine constructed as described is as follows: The machine is placed in position close to the breast of the coal, the cutters having been previously run back to their limit. The machine is lowered to the floor by means of the hand levers 111, and the braces 119 arranged in position in the manner described. Compressed air is admitted into the cylinders 2, through the pipe 4, and the engine started in a manner well known in the art. The motion of the pistons is transmitted through the train of gearing 12—13—14—15 to the shaft 16 giving the disk-cranks 20 a rapid rotary movement. This rotary movement of the disks 20 gives the carriage 22 a reciprocating movement by being connected thereto by the pitmen 21. This backward and forward movement of the carriage 22 operates the cutters to plow a furrow or undermine the coal which in practice would be about three inches high and five feet long. It will be noticed (see Fig. 10) that the cutters at the center of the apparatus project farther into the coal than those toward the ends of the bars, making a gradual taper both ways from the inner ends of the cutter bars 91, thereby engaging the said cutters at the center first. This gradual taper of the position of the cutters will form the breast of the furrow into a series of steps, each of which is of a length equal to the length of one-half the stroke of the carriage 22, thereby permitting the cutters to be fed forward without coming in contact with any portion of the coal. The pointed cutters 108 at each outer end of the bars 91 plows a groove, and is followed by the double chisel shaped cutter, which removes a portion above and below the said groove, leaving a comparatively smooth surface at the bottom of the undercut, and as the feed is regular each set of cutters is brought against the end of the steps, removing the same only to form others. The feed of each bar 91 takes place at the end of the stroke of the carriage, and moves the idle cutters forward, each into the step at the rear of their last cut, and at the opposite stroke the other bar is fed forward, thereby undermining the coal to the depth of the movement of the supporting bars 23. This feed of the cutter-bars 91, is accomplished by the points of triangular levers 31 in their movement beneath the stationary frame, entering between the inclined surfaces 74—76, and slightly rotating the shafts 27—28, and at the backward movement of the said levers, moves the pawls 43 back to engage with other teeth of the ratchet wheels 40, to again revolve the said shafts in the same direction. This rotary movement of the shafts 27—28 is transferred by means of the worms 30, and wheels 32 to the shaft 35, and from the said shaft to the stub-wheels 126, thereby moving each set of supporting bars 23 alternately to feed the cutter-bars forward. After the cutters have undermined the coal to their entire depth or full length of the movement of the same, and it is necessary to bring the said bars back to their former position, the levers 51 are elevated to disengage the pawls 43 from their ratchet wheels, in the manner described to permit the shafts 27—28 to revolve freely in their bearings. The ratchet bar 77 is lowered into mesh with the gear wheels 60 by means of the hand-lever 84. The engine is started and the table or carriage 22 moved back and forward or reciprocated as before described. At this movement of the carriage 22 the gear wheels 60 are rapidly rotated in both directions, as they move along the stationary rack-bar 77, and by the operation of the pawls 64, on the ratchet wheels 62, rotated the said shafts 27—28 in an opposite direction to that when the same are feeding the cutters forward.

To operate the bars by hand for the purpose of regulating, fitting, and otherwise adjusting the various parts of the feeding mechanism, it is only necessary to disengage the pawls 43 by means of their levers from the ratchet wheels 40, and operate the levers 54 to engage their pawls 43′ with the ratchets 42, and by revolving the hand wheels 57, move the bars 23 to the desired position.

It has been demonstrated by actual working of a machine constructed substantially as described, that an undercut into solid coal can be made at the rate of a square yard per minute, and has been thoroughly tested for rapidity, durability, and simplicity of operation in the various coal mines in this vicinity.

Having thus described my invention, I claim—

1. In combination with the cutter bar, the double pronged cutter having the prongs flaring from each other and extending lengthwise of the cutter bar, and a single cutter secured to the cutter alongside the double cutter and extending between the prongs of the double cutter, substantially as described.

2. A cutter for undercutting coal, consisting of the removable point 103, a V shaped inwardly tapering shoulder 100, a recess 101 formed at the rear of the tongue 103, a shank 97 adapted to be attached to the cutter bars, having a slot for the reception of the said tongue 103 provided with registering V shaped bearings, and integral portion 102 arranged within the said slot, whereby said removable point may be retained in position without bolts or other fastener, substantially as and for the purpose described.

3. In combination, a reciprocating frame, cutter bars carried thereby, feeding mechanism for said cutter bars, shafts 27—28 for operating the feeding mechanism, a stationary frame above the shafts, levers 31 secured to the shafts by a pawl and ratchet connection said levers having points or extensions engaging openings in the stationary frame whereby in the reciprocation of the cutter carriage the said levers 31 rotate the said shafts, substantially as described.

4. In combination with the cutter bars, shaft 35 and the feeding shafts 27—28 of a machine such as described, the ratchet-wheels 42 attached thereto, the hand wheels attached to the hubs of said ratchet wheels, spring actuated pawls 43′ to engage with the said ratchets, and levers 54 to operate the said pawls to disengage the same, substantially as described.

5. In combination with the shaft 35 and the shafts 27—28 for moving the cutter bars, and the means for rotating the said shafts 27, 28 the gear wheels 60, attached to the ratchet wheels 62, disks 63 arranged in connection with the said ratchet wheels rigidly attached to the said shafts, spring actuated pawls 64 pivoted to the said disks, and the rack-bar 77 pivoted to the frame, and capable of being lowered in mesh with the said gear wheels, or disengaged therefrom, as and for the purpose described.

6. In a mining machine, a reciprocating frame consisting of side portions 22 moving on guides on the main frame of the machine, a series of slots in said side portions to receive the cutter bar supports, the bars 34, alternating with the slots, extending between the sides 22 and diagonally arranged braces passing beneath the tie rods and connected thereto, substantially as described.

7. In a mining machine, a pair of cutter bars joined together at their adjacent ends by a tongue and groove connection, recesses in the top and bottom surface adapted to receive suitable cutters secured thereto, feed bars for said cutters and dove tail connections between said feed bars and cutter bars, substantially as described.

8. In combination with a machine such as described, the cutter bars, the feed bars, each consisting of a bar of sufficient length having a dove tail recess formed in the forward end, and a series of openings 24 formed with a bell-mouth, and spur wheels for feeding the bars, substantially as described.

9. In combination with the feed bars, the triangular levers 31, the ratchets and pawls, the stationary frame 68 and the plates 70 and 75 adapted to engage with the said levers, the said plates being adjustable toward or from each other, the parts being connected and operating substantially as described.

In testimony that I claim the foregoing I hereunto affix my signature this 3d day of July, A. D. 1893.

JONATHAN W. HARRISON. [L. S.]

In presence of—
 CHAS. S. DOUGHERTY,
 F. P. BOGARDUS.